United States Patent [19]

Aubel

[11] 4,310,016

[45] Jan. 12, 1982

[54] DIFFERENTIAL PRESSURE DELAY VALVE

[75] Inventor: John A. Aubel, Decatur, Ill.

[73] Assignee: Borg-Warner Corporation, Chicago, Ill.

[21] Appl. No.: 155,242

[22] Filed: Jun. 2, 1980

[51] Int. Cl.3 .......................... F16K 17/18; F02M 3/00

[52] U.S. Cl. .................................. 137/493.8; 123/339; 137/513.7; 137/510; 137/DIG. 9

[58] Field of Search ............... 123/320, 339, 341, 389, 123/409; 137/493.8, 513.3, 513.7, 510, 599, DIG. 9

[56] References Cited

U.S. PATENT DOCUMENTS 3,730,154 5/1973 Vartanian .
3,996,955 12/1976 Kawabata .
4,010,721 3/1977 Ludwig .
4,079,750 3/1978 Ludwig .
4,098,850 7/1978 Tamura ........................ 137/513.7 X
4,168,680 9/1979 Kawai et al. .
4,182,291 1/1980 Ito ...................................... 123/339

*Primary Examiner*—Robert G. Nilson
*Attorney, Agent, or Firm*—Florian S. Gregorczyk

[57] ABSTRACT

A differential pressure delay valve for vacuum controlled devices is disclosed. The valve has input, output and third chambers with a controlled flow orifice in a separating plate between the input and third chambers; a diaphragm operator with a controlled flow orifice between the input and third chambers; a stem with a seal on one end attached to and operated by the diaphragm to open or close a port in the separating plate; and, a bias spring of any predetermined level to maintain the port in a closed position is located in either the input or third chambers. The diaphragm operator opens the port to balance the pressures in the input and output chambers when the change in input pressure or vacuum both is greater than the bias force of the spring and too sudden for rapid dissipation through the fixed orifices. At pressure changes less than the bias force of the spring the valve operates as a standard delay valve.

12 Claims, 3 Drawing Figures

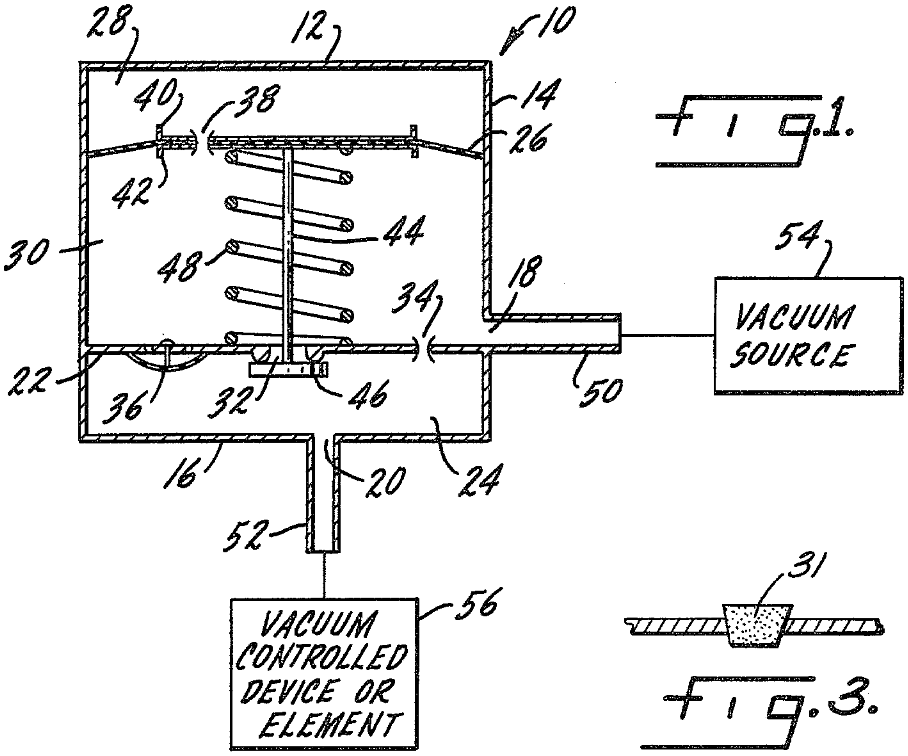
Fig.1.
Fig.3.
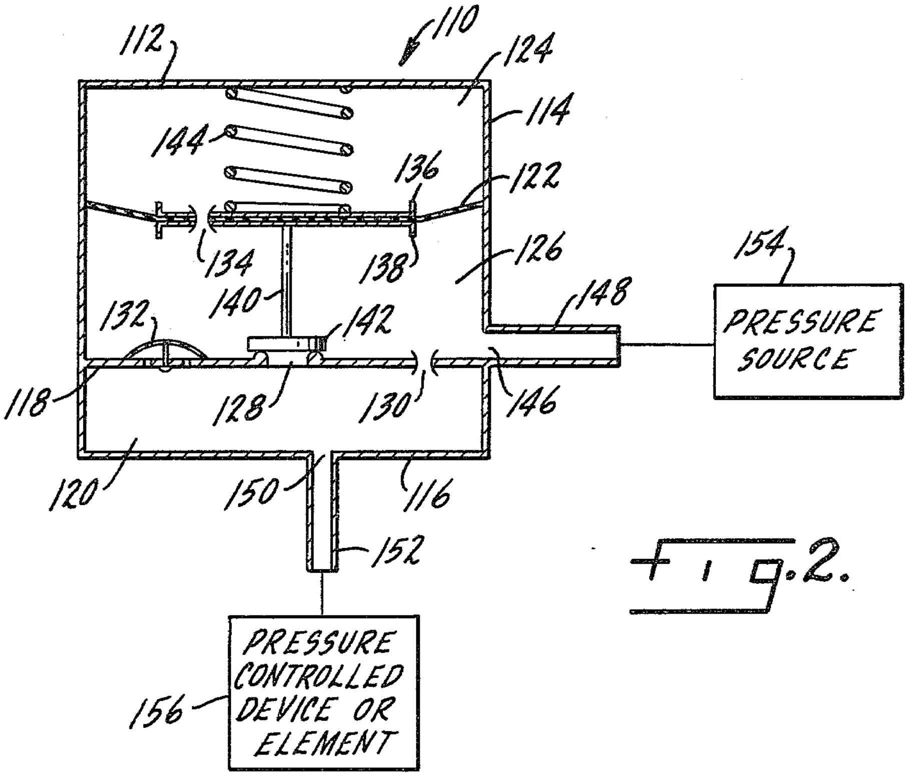
Fig.2.

DIFFERENTIAL PRESSURE DELAY VALVE

BACKGROUND OF THE INVENTION

This invention relates to a valve generally used to control a vacuum motor in response to a vacuum or pressure signal from a monitored source. More specifically, this invention relates to control of a vacuum operated idle-speed control system provided with a mechanism that responds rapidly to a very fast increase in vacuum from the monitored source. Delay valves are in wide spread use throughout the automotive industry to perform control functions. In the present case, a delay valve in a vacuum line may be connected to the idle control of an automobile engine through a controlling dashpot. The dashpot generally controls carburetor throttle opening in response to a signal from the delay valve which monitors a vacuum signal, such as the manifold vacuum of an internal combustion engine. The present delay valves have a time delay between a sensing of a vacuum level change in the manifold vacuum and the response or "delivery time" of that sensed change to the controlled element or device.

In an automobile, the failure of the dashpot to quickly respond to a rapid reduction in the manifold vacuum due to a delay valve leads to an open throttle, higher engine revolutions per minute (rpm's) and consequently added gas consumption. Present delay valve arrangements prevent the idle speed dashpot from compensating for suddenly changing engine conditions by providing relatively long time delays between an engine condition change and a response to that change in the dashpot, which change in the dashpot is based on the sensed engine change.

One method of controlling a segment of the above mentioned vacuum change is the avoidance of the use of a delay valve; however, this leads to erratic engine operating conditions and added pollution control problems. Alternatively, a control arrangement of bypassing a delay valve, under a given condition or after a fixed parameter is exceeded, is preferred. Such a bypass arrangement allows a delay valve to operate in the present mode under most conditions while overcoming the circumstance where there is a rapid change in the monitored condition, such as a deceleration which causes a rapid decrease in engine manifold vacuum from atmospheric pressure. These sudden changes in vacuum levels are frequently experienced by an automotive engine, especially in such conditions as rapid acceleration and rapid deceleration.

SUMMARY OF THE INVENTION

A differential pressure delay valve constructed in accordance with the invention has a body enclosure wherein a separating member of plate within the enclosure helps to define the input and output chambers. A diaphragm or pneumatic operator in the cavity partitions a third chamber from the input chamber. The separating member defines a port through which a stem extends. The stem has sealing means at one end, and is affixed to the diaphragm operator at its opposite end.

An umbrella valve and a fixed orifice are mounted in the separating member and communicate between the input and output chambers. The stem is operable by the diaphragm operator and is biased by a spring to normally seal the centrally located port. The diaphragm operator defines a fixed orifice for communication between the input chamber and the third chamber. The monitored input control parameter is communicated to the input chamber by an input port and the output chamber communicates with the control device through an output port. Both the input and output ports are defined by the valve body and have protruding fittings to allow connection between the valve and the monitored and control elements.

More particularly this differential pressure delay valve has as a principal objective to allow the rapid dissipation of a sudden change in vacuum or pressure differential which varies from a fixed or predetermined pressure or vacuum level. The pressure or vacuum differential between input and output chambers is allowed to balance or maintain equilibrium by the opening of the centrally located port. The bias of the spring mounted in one of the chambers determines that level at which that port, that is, the stem and seal, will open. The pressure or vacuum differential between the input chamber and the third and output chambers attains equilibrium thereafter through the fixed orifices of the separating member and the diaphragm operator.

BRIEF DESCRIPTION OF THE DRAWING

In the two figures of the drawing, like reference numerals identify like components, and in that drawing:

FIG. 1 is a cross-section of a schematic illustration of a pressure differential delay valve: and FIG. 2 is a cross-section of an alternative embodiment of a pressure differential delay valve;

FIG. 3 is a cross-section of a schematic illustration of a porous plug insert in a fixed orifice.

DETAILED DESCRIPTION OF THE INVENTION

In FIG. 1 a pressure differential delay valve 10 is shown with a valve body or wall structure 12 having a side wall 14 and a bottom wall 16 where body 12 defines an enclosure, an input port 18, and an output port 20. The enclosure is divided into three chambers. A separating plate or member 22 is mounted in the body enclosure, and in cooperation with body 12 defines an output chamber 24. A diaphragm or pneumatic operator 26 mounted in the body enclosure in conjunction with body 12 defines third chamber 28. Diaphragm operator 26, separating plate 22 and valve body 12 define an input chamber 30 positioned between chambers 24 and 28 in the body enclosure.

Separating plate 22 defines a centrally located port 32, which communicates between input chamber 30 and output chamber 24. Mounted in separating plate 22 are a fixed orifice 34 and an umbrella valve arrangement 36; orifice 34 and valve 36 communicate between input chamber 30 and output chamber 24. Fixed orifice 34 communicates between input chamber 30 and output chamber 24 to allow a controlled rate of change of pressure between chambers 30 and 24. Mounted in diaphragm operator 26 is a second fixed orifice 38 communicating between input chamber 30 and third chamber 28 and allowing a controlled rate of pressure change. Affixed on either side of diaphragm operator 26 are mounting plates 40 and 42 in chambers 28 and 30, respectively. Connected to mounting plate 42 is a stem 44 with a sealing or seal device 46 mounted on its opposite end. Stem 44 extends through chamber 30 and port 32, and stem 44 in its movement displaces seal 46 to open port 32 or to sealingly engage and close port 32. Stem 44 is operable by diaphragm operator 26. Stem 44, diaphragm operator 26, and seal 46 are shown in their port-closing position in FIG. 1. A bias spring 48, mounted between separating plate 22 and mounting plate 42 in chamber 30, maintains seal 46 in a closed position in the illustrated valve position. The bias force of spring 48 may be selected at any predetermined value down to two inches of mercury or larger.

Port 18, which opens from input chamber 30 in sidewall 14 has a connecting element 50 affixed therein for communication between a vacuum source 54 and chamber 30. Similarly, port 20 which opens from output chamber 24 in bottom wall 16 has a connecting element 52 affixed therein for communication between chamber 24 and a controlled device or element 56, generally a vacuum motor or dashpot.

The differential pressure delay valve 10 is responsive to a vacuum condition, such as, in this case, a pressure condition below atmospheric pressure. The terms "input vacuum" and "output vacuum" refer to the condition in the input chamber 30 and the output chamber 24, respectively. Vacuum source 54 can be an internal combustion engine manifold vacuum or a vacuum pump. In the case where manifold vacuum from an automobile engine is used the valve will track the changing vacuum conditions such that the following conditions will prevail: (1) input vacuum conditions will equal output vacuum conditions at vacuum changes greater than the bias force of bias spring 48; and, (2) at differential vacuums greater than the force of bias spring 48, valve 10 allows input to equal output immediately and only allows a delay for the portion of the differential in vacuum levels less than the bias force of spring 48.

In FIG. 1, delay valve 10 is shown with stem 44 urging seal 46 against separating plate 22, thereby sealing port 32. Diaphragm operator 26 with mounting plates 40 and 42 maintains seal 46 in this closed position by bias spring 48 at vacuum differential levels between chambers 30 and 28 less than the bias force of spring 48. The pressure or vacuum level of input chamber 30 is continuously allowed to communicate at a controlled rate to third chamber 28 through second fixed orifice 38.

As a vacuum as previously described is introduced to chamber 30, it can communicate to chambers 24 and 28 through fixed orifices 34 and 38, respectively. However, the rate of this pressure communication is relatively slow by design. The vacuum depression, that is, the pressure decrease from atmospheric pressure, in chamber 30 can get larger at a rate of increase that is greater than the rate of pressure equalization between chambers 28 and 30. As a result the differential between the pressure (a force) in chambers 30 and 28 can increase until this force is sufficient to overcome the predetermined bias force of bias spring 48 to open port 32. There is also a differential pressure between chambers 30 and 24 which follows the pressure differential between chambers 30 and 28, but there is no fixed relationship between these two pressure differentials. When the pressure differential between chambers 30 and 28 is great enough diaphragm operator 26 flexes toward chamber 30, depressing stem 44 and moving sealing device 46 away from port 32 to allow immediate communication between chambers 30 and 24. This direct communication immediately balances the vacuum levels in chambers 30 and 24. Bias spring 48 brings valve 10 to the illustrated position when the differential vacuum between chambers 30 and 28 is less than the bias force. The remaining slight differential between chambers 30 and, 24 and 28 is then allowed to slowly dissipate and balance through fixed orifices 34 and 38, respectively.

The vacuum level in input chamber 30 is allowed to immediately communicate to output chamber 24 when there are sudden large changes in the vacuum input level. At rates of input vacuum increase in chamber 30 less than the rate of vacuum equalization between chambers 30 and 28 through orifice 38 the vacuum differential between chambers 30 and 24 will only communicate through orifice 34. Immediate communication between chambers 30 and 24 also occurs upon a sudden increase in pressure in the input chamber. This sudden pressure increase is communicated through umbrella valve 36 from chamber 30 through chamber 24. During a sudden pressure increase diaphragm operator 26 maintains its position and seals port 32 with seal 46.

Thus the output vacuum level will not be greater than the input vacuum level, and for any vacuum differential between input and output above the bias spring 48 force, there will be an immediate balancing response by valve 10. The final incremental vacuum difference less than the bias spring force is allowed to slowly balance from chamber 30 through the orifices 34 and 38 to chambers 24 and 28, respectively.

In the case of an automobile dashpot controller, the following problem is thereby resolved: At a false start, that is, sudden acceleration and then sudden deceleration, the change in vacuum level is communicated immediately from the manifold vacuum, through the input chamber, to the output chamber and thereby to the dashpot to reduce the throttle opening and engine rpm's. This reduction in engine rpm's results in fuel savings and gives the driver immediate control of the engine with a lower idle rate.

FIG. 2 illustrates an alternative embodiment of a differential delay valve 110 that is responsive to a change in pressure above atmospheric or above any reference pressure. Delay valve 110 is shown with a valve body 112 with a sidewall 114 and a bottom wall 116, where valve body 112 defines an enclosure which is divided into three chambers.

A separating plate 118 is mounted in the body enclosure and, in cooperation with body 112, defines an output chamber 120. A diaphragm operator 122 is mounted in the enclosure and, with valve body 112, defines a third chamber 124. The volume between diaphragm operator 122 and separating plate 118 in the enclosure is an input chamber 126. Separating plate 118 defines a centrally located port 128 communicating between chambers 126 and 120. Mounted in separating plate 118 are a fixed orifice 130 and an umbrella valve 132 which relieves a high pressure from output chamber 120 to input chamber 126. Mounted in the diaphragm operator 122 is a fixed orifice 134 communicating between input chamber 126 and third chamber 124. Mounted on either side of diaphragm operator 122 are mounting plates 136 and 138 in chambers 124 and 126, respectively. A stem 140 is affixed to mounting plate 138 and is operable by diaphragm 122. Affixed to or near the end of stem 140 in chamber 126 is a sealing device 142 operable with tube 140 and engageable with separating plate 118 to seal port 128 when valve 110 is in the position shown in FIG. 2. A bias spring 144 is positioned between mounting plate 136 and valve body 122 in chamber 124 to maintain sealing device 142 in the closed position.

Sidewall 114 defines an input port 146 with a fitting 148 affixed therein to communicate between a controlling or monitored pressure source 154 and input chamber 126 of valve 110. Bottom wall 116 defines an output port 150 with a fitting 152 positioned therein to communicate between a pressure controlled device or element 156 and output chamber 120 of valve 110.

The closed position of valve 110 in FIG. 2 is shown wherein sealing device 142 engages separating plate 118 to block communication between chambers 126 and 120 through port 128. Diaphragm operator 122, stem 140 and seal 143 are maintained in their illustrated positions to close port 128 by bias spring 144. A pressure imposed in chamber 126 through port 146 from a source 154 would dissipate to output chamber 120 through fixed orifice 130, and to chamber 124 through fixed orifice 134. When the pressure in input chamber 126 is such that the pressure differential between third chamber 124 and input chamber 126 is greater than the bias force of spring 140 then diaphragm operator 122 will move to open port 132 and thereby immediately equalize the pressure in chamber 126 and 120. Diaphragm operator 122 will close port 128 with seal 142 when the bias force of spring 144 is greater than the pressure differential between chambers 126 and 124. The pressure differential between chambers 126 and 124 is dissipated at a controlled rate through fixed orifice 134. A sudden increase in pressure in chamber 120 above that in chamber 126 would be rapidly balanced through umbrella valve 132.

Fixed orifices 34 and 38 of FIG. 1, and fixed orifices 130 and 134 of FIG. 2 are apertures which may have a porous plug inserted therein to operate as a fixed orifice. In FIG. 3 a porous plug 31 is illustrated as retained in a fixed orifice such as orifice 34 or 38 of FIG. 1 and orifices 130 or 134 of FIG. 2.

Those skilled in the art will recognize that certain variations can be made in the illustrated embodiments. While only specific embodiments of the invention have been described and shown, it is apparent that various alterations and modifications can be made therein. It is, therefore, the intention in the appended claims to cover all such modifications and alterations as may fall within the true scope and spirit of the invention.

I claim:

1. A differential pressure delay valve, comprising:

a wall structure defining an enclosure, a separating plate mounted in the enclosure to define an input chamber and an output chamber, which separating plate defines a port and an aperture between the input and output chambers, an umbrella valve operatively mounted in the separating plate to relieve an over-pressure condition, a diaphragm operator mounted in the enclosure to define a third chamber adjacent the input chamber, an aperture in the diaphragm operator to communicate between the input and third chambers, said wall structure defining an input port for the input chamber to provide an input connection, said wall structure also defining an output port for the output chamber to provide an output connection, a stem with a sealing means affixed near one end thereof, which stem extends through the separating plate port, through the input chamber, and is connected to and operative by the diaphragm operator, and a bias spring, positioned in one of the input and third chambers, effective to bias the diaphragm operator to close the separating plate port with the sealing means in the absence of a predetermined pressure difference between the third and input chambers.

2. A delay valve as claimed in claim 1, in which the aperture in the separating plate is a fixed orifice.

3. A delay valve as claimed in claim 1, in which the aperture in the diaphragm is a fixed orifice.

4. A delay valve as claimed in claim 1, and further comprising a porous plug mounted in the separating plate aperture, which plug defines at least one fixed orifice.

5. A delay valve as claimed in claim 1, and further comprising a porous plug mounted in the diaphragm aperture, which plug defines at least one fixed orifice.

6. A delay valve as in claim 1, and a vacuum source coupled to said input connection to operate the valve.

7. A delay valve as in claim 1, and a pressure source coupled to said input connection to operate the valve.

8. A delay valve as in claim 1, wherein said spring provides a bias force of at least two inches of mercury pressure differential.

9. A delay valve as in claim 1 wherein the seal is located in the output chamber and the umbrella valve opens to the output chamber from the input chamber.

10. A delay valve as in claim 1 wherein the seal is located in the input chamber and the umbrella valve opens to the input chamber from the output chamber.

11. A differential pressure delay valve, comprising:

a wall structure defining an enclosure, a separating plate mounted in the enclosure to define an input chamber and an output chamber, which separating plate defines a port and an aperture with a porous plug between the input and output chambers, an umbrella valve operatively mounted in the separating plate to relieve an over-pressure condition in the input chamber, a diaphragm operator mounted in the enclosure to define a third chamber adjacent the input chamber, an aperture with a porous plug in the diaphragm operator to communicate between the input and third chambers, said wall structure defining an input port for the input chamber to provide an input connection, said wall structure also defining an output port for the output chamber to provide an input connection, said wall structure also defining an output port for the output chamber to provide an output connection, a stem with a sealing means located in the output chamber and affixed near one end of the stem, which stem extends through the separating plate port, through the input chamber, and is connected to and operative by the diaphragm operator, and a bias spring with a bias force of less than two inches of mercury pressure, positioned in the input chamber, effective to bias the diaphragm operator to close the separating plate port with the sealing means in the absence of a pressure difference greater than two inches of mercury between the third and input chambers.

12. A differential pressure delay valve, comprising:

a wall structure defining an enclosure, a separating plate mounted in the enclosure to define an input chamber and an output chamber, which separating plate defines a port and an aperture with a porous plug between the input and output chambers, an umbrella valve operatively mounted in the separating plate to relieve an over-pressure condition in the output chamber, a diaphragm operator mounted in the enclosure to define a third chamber adjacent the input chamber, an aperture with a porous plug in the diaphragm operator to communicate between the input and third chambers, said wall structure defining an input port for the input chamber to provide an input connection, said wall structure also defining an output port for the output chamber to provide an output connection, a stem with a sealing means located in the input chamber and affixed near one end of the stem, which stem extends through the input chamber, and is connected to and operative by the diaphragm operator, a bias spring with a bias force of at least two inches of mercury pressure, positioned in third chamber, effective to bias the diaphragm operator to close the separating plate port with the sealing means in the absence of a pressure difference greater than two inches of mercury between the input and third chambers.

* * * * *